(12) United States Patent
Colbeck

(10) Patent No.: US 9,667,154 B2
(45) Date of Patent: May 30, 2017

(54) DEMAND-CONTROLLED, LOW STANDBY POWER LINEAR SHUNT REGULATOR

(71) Applicant: Power Integrations, Inc., San Jose, CA (US)

(72) Inventor: Roger Colbeck, Ottawa (CA)

(73) Assignee: Power Integrations, Inc., San Jose, CA (US)

(*) Notice: Subject to any disclaimer, the term of this patent is extended or adjusted under 35 U.S.C. 154(b) by 0 days.

(21) Appl. No.: 14/858,823

(22) Filed: Sep. 18, 2015

(65) Prior Publication Data

US 2017/0085182 A1 Mar. 23, 2017

(51) Int. Cl.
*H02M 3/335* (2006.01)

(52) U.S. Cl.
CPC ............... *H02M 3/33507* (2013.01)

(58) Field of Classification Search
CPC ......... H02M 3/33507; H02M 3/33523; H02M 3/33561; H02M 3/33569; H02M 3/33576; H02M 3/33592; H02M 1/36; H02M 2001/0032; Y02B 70/1433; Y02B 70/1441; Y02B 70/1475
USPC ........................................... 363/21.01–21.18
See application file for complete search history.

(56) References Cited

U.S. PATENT DOCUMENTS

| | | |
|---|---|---|
| 3,740,581 A | 6/1973 | Pfiffner |
| 4,777,580 A | 10/1988 | Bingham |
| 4,866,585 A * | 9/1989 | Das ..................... H02M 7/219 363/127 |
| 4,871,686 A | 10/1989 | Davies |
| 4,875,151 A | 10/1989 | Ellsworth et al. |
| 4,972,237 A | 11/1990 | Kawai |
| 4,982,260 A | 1/1991 | Chang et al. |
| 5,008,794 A | 4/1991 | Leman |
| 5,072,268 A | 12/1991 | Rumennik |

(Continued)

FOREIGN PATENT DOCUMENTS

| | | |
|---|---|---|
| EP | 0975024 | 1/2000 |
| JP | 2003142698 | 5/2003 |

OTHER PUBLICATIONS

Maleis: "Full-Wave Rectifier for CMOS IC chip". Reg. No. H64, May 6, 1986.

(Continued)

*Primary Examiner* — Yemane Mehari
(74) *Attorney, Agent, or Firm* — The Law Offices of Bradley J. Bereznak

(57) ABSTRACT

A shunt regulator for use in a power converter having an energy transfer element for regulating a transfer energy of the output signal delivered to the load. An auxiliary winding of the energy transfer element being utilized to produce an internal bypass voltage, $V_{BP}$, at a bypass pin coupled to an external capacitive load, the shunt regulator including a two-mode operational amplifier that produces an output signal that controls a shunt current through the shunt switch. At power-up, or at low load conditions, the operational amplifier operates in a low-power mode of operation with low quiescent current. When a current comparator circuit senses that the shunt current exceeds a predetermined level, the current comparator circuit sets a latch which produces a logical signal that causes the operational amplifier to switch to a high-power mode of operation.

14 Claims, 3 Drawing Sheets

(56) References Cited

U.S. PATENT DOCUMENTS

| | | | |
|---|---|---|---|
| 5,164,891 A * | 11/1992 | Keller | G05F 1/563 323/222 |
| 5,258,636 A | 11/1993 | Rumennik et al. | |
| 5,274,259 A | 12/1993 | Grabowski et al. | |
| 5,282,107 A * | 1/1994 | Balakrishnan | H03K 17/0822 323/274 |
| 5,285,367 A | 2/1994 | Keller | |
| 5,313,082 A | 5/1994 | Eklund | |
| 5,323,044 A | 6/1994 | Rumennik et al. | |
| 5,411,901 A | 5/1995 | Grabowski et al. | |
| 5,510,972 A | 4/1996 | Wong | |
| 5,612,567 A | 3/1997 | Baliga | |
| 5,850,337 A | 12/1998 | Lee | |
| 5,880,942 A | 3/1999 | Leu | |
| 5,969,566 A | 10/1999 | Weber et al. | |
| 6,084,277 A | 7/2000 | Disney et al. | |
| 6,157,049 A | 12/2000 | Mitlehner et al. | |
| 6,168,983 B1 | 1/2001 | Rumennik et al. | |
| 6,207,994 B1 | 3/2001 | Rumennik et al. | |
| 6,252,288 B1 | 6/2001 | Chang | |
| 6,366,485 B1 | 4/2002 | Fujisawa | |
| 6,424,007 B1 | 7/2002 | Disney | |
| 6,445,600 B2 | 9/2002 | Ben-Yaakov | |
| 6,465,291 B1 | 10/2002 | Disney | |
| 6,468,847 B1 | 10/2002 | Disney | |
| 6,489,190 B2 | 12/2002 | Disney | |
| 6,501,130 B2 | 12/2002 | Disney | |
| 6,504,209 B2 | 1/2003 | Disney | |
| 6,509,220 B2 | 1/2003 | Disney | |
| 6,549,439 B1 | 4/2003 | Yu | |
| 6,552,597 B1 | 4/2003 | Disney | |
| 6,555,873 B2 | 4/2003 | Disney et al. | |
| 6,555,883 B1 | 4/2003 | Disney et al. | |
| 6,563,171 B2 | 5/2003 | Disney | |
| 6,570,219 B1 | 5/2003 | Rumennik et al. | |
| 6,573,558 B2 | 6/2003 | Disney | |
| 6,577,512 B2 | 6/2003 | Tripathi et al. | |
| 6,583,663 B1 | 6/2003 | Disney | |
| 6,633,065 B2 | 10/2003 | Rumennik et al. | |
| 6,635,544 B2 | 10/2003 | Disney | |
| 6,639,277 B2 | 10/2003 | Rumennik et al. | |
| 6,661,276 B1 | 12/2003 | Chang | |
| 6,667,213 B2 | 12/2003 | Disney | |
| 6,680,646 B2 | 1/2004 | Disney | |
| 6,724,041 B2 | 4/2004 | Rumennik et al. | |
| 6,724,244 B2 | 4/2004 | Wu | |
| 6,730,585 B2 | 5/2004 | Disney | |
| 6,734,461 B1 | 5/2004 | Shiomi et al. | |
| 6,734,714 B2 | 5/2004 | Disney | |
| 6,750,105 B2 | 6/2004 | Disney | |
| 6,759,289 B2 | 7/2004 | Disney | |
| 6,768,171 B2 | 7/2004 | Disney | |
| 6,768,172 B2 | 7/2004 | Rumennik et al. | |
| 6,777,749 B2 | 8/2004 | Rumennik et al. | |
| 6,781,198 B2 | 8/2004 | Disney | |
| 6,787,437 B2 | 9/2004 | Rumennik et al. | |
| 6,787,847 B2 | 9/2004 | Disney et al. | |
| 6,798,020 B2 | 9/2004 | Disney et al. | |
| 6,800,903 B2 | 10/2004 | Rumennik et al. | |
| 6,815,293 B2 | 11/2004 | Disney et al. | |
| 6,818,490 B2 | 11/2004 | Disney | |
| 6,825,536 B2 | 11/2004 | Disney | |
| 6,828,631 B2 | 12/2004 | Rumennik et al. | |
| 6,838,346 B2 | 1/2005 | Disney | |
| 6,865,093 B2 | 3/2005 | Disney | |
| 6,882,005 B2 | 4/2005 | Disney et al. | |
| 6,933,769 B2 | 8/2005 | Koelling | |
| 6,987,299 B2 | 1/2006 | Disney et al. | |
| 7,092,268 B2 | 8/2006 | George | |
| 7,115,958 B2 | 10/2006 | Disney et al. | |
| 7,135,748 B2 | 11/2006 | Balakrishnan | |
| 7,193,402 B2 | 3/2007 | Lee et al. | |
| 7,220,629 B2 | 5/2007 | Balakrishnan | |
| 7,221,011 B2 | 5/2007 | Banerjee et al. | |
| 7,221,128 B2 | 5/2007 | Usui et al. | |
| 7,233,191 B2 | 6/2007 | Wang et al. | |
| 7,253,042 B2 | 8/2007 | Disney | |
| 7,253,059 B2 | 8/2007 | Balakrishnan | |
| 7,295,451 B2 | 11/2007 | Charles | |
| 7,301,389 B2 | 11/2007 | Coady | |
| 7,335,944 B2 | 2/2008 | Banerjee | |
| 7,348,830 B2 | 3/2008 | Debroux | |
| 7,381,618 B2 | 6/2008 | Disney | |
| 7,391,088 B2 | 6/2008 | Balakrishnan | |
| 7,408,796 B2 | 8/2008 | Soldano | |
| 7,459,366 B2 | 12/2008 | Banerjee | |
| 7,468,536 B2 | 12/2008 | Parthasarathy | |
| 7,494,875 B2 | 2/2009 | Disney | |
| 7,557,406 B2 | 7/2009 | Parthasarathy | |
| 7,585,719 B2 | 9/2009 | Balakrishnan | |
| 7,595,523 B2 | 9/2009 | Parthasarathy et al. | |
| 7,616,050 B2 | 11/2009 | Eckstein | |
| 7,741,788 B2 | 6/2010 | Ito et al. | |
| 7,760,524 B2 * | 7/2010 | Matthews | H02M 3/33507 363/45 |
| 7,893,754 B1 | 2/2011 | Kung | |
| 7,999,606 B2 | 8/2011 | Kung et al. | |
| 8,115,457 B2 | 2/2012 | Balakrishnan et al. | |
| 8,125,265 B2 | 2/2012 | Kung et al. | |
| 8,278,994 B2 | 10/2012 | Kung et al. | |
| 8,300,440 B2 * | 10/2012 | Ho | H02M 7/217 363/127 |
| 8,373,356 B2 | 2/2013 | Shao et al. | |
| 9,148,929 B2 | 9/2015 | Jiang et al. | |
| 2001/0043480 A1 | 11/2001 | Shona | |
| 2002/0125541 A1 | 9/2002 | Korec et al. | |
| 2003/0201821 A1 | 10/2003 | Coady | |
| 2004/0041622 A1 | 3/2004 | Wu | |
| 2004/0061454 A1 | 4/2004 | Prasad | |
| 2004/0109335 A1 | 6/2004 | Gan et al. | |
| 2005/0035371 A1 | 2/2005 | Fujihira | |
| 2005/0167749 A1 | 8/2005 | Disney | |
| 2005/0212583 A1 | 9/2005 | Pai | |
| 2005/0230745 A1 | 10/2005 | Fatemizadeh et al. | |
| 2005/0242411 A1 | 11/2005 | Tso | |
| 2006/0028779 A1 | 2/2006 | Bax et al. | |
| 2007/0035286 A1 | 2/2007 | Lee et al. | |
| 2007/0146020 A1 | 6/2007 | Williams | |
| 2007/0211504 A1 * | 9/2007 | Unkrich | H02M 7/064 363/89 |
| 2008/0018261 A1 | 1/2008 | Kastner | |
| 2008/0136350 A1 | 6/2008 | Tripathi et al. | |
| 2008/0259653 A1 * | 10/2008 | Baurle | H02M 3/33507 363/21.12 |
| 2009/0016090 A1 | 1/2009 | Knight | |
| 2009/0040795 A1 * | 2/2009 | Park | G06F 1/324 363/21.15 |
| 2009/0120200 A1 * | 5/2009 | Chakrabartty | A61F 2/468 73/808 |
| 2009/0261790 A1 | 10/2009 | Arduini | |
| 2010/0109561 A1 | 5/2010 | Chen et al. | |
| 2011/0025278 A1 | 2/2011 | Balakrishnan et al. | |
| 2011/0149615 A1 | 6/2011 | Matthews | |
| 2012/0028083 A1 | 2/2012 | Jung | |
| 2012/0074896 A1 | 3/2012 | Lui et al. | |
| 2013/0020964 A1 | 1/2013 | Nuhfer et al. | |
| 2014/0340065 A1 | 11/2014 | Svorc et al. | |

OTHER PUBLICATIONS

Popa et al., "Optimal Curvature-Compensated BiCMOS Bandgap Reference". Image and Signal Processing and Analysis, 2001, pp. 507-510, Fig. 2.

* cited by examiner

DEMAND-CONTROLLED, LOW STANDBY POWER LINEAR SHUNT REGULATOR

TECHNICAL FIELD

The present disclosure generally relates to the field of electronic circuitry. More particularly, the present disclosure relates to a shunt regulator that can operate in tandem with a voltage regulator that delivers a regulated output current to a load.

BACKGROUND

Electronic devices use power to operate. Power converters are commonly used due to their high efficiency, small size and low weight to power many of today's electronics. Conventional wall sockets provide a high voltage alternating current. In a switching power converter a high voltage alternating current (ac) input is converted to provide a well regulated direct current (dc) output through an energy transfer element. The switching power converter typically includes a controller that provides output regulation by sensing the output and controlling it in a closed loop.

A power converter controller typically receives power for its internal blocks from a supply terminal. In some instances, this supply terminal may be referred to as a bypass (BP) pin/terminal, or a $V_{DD}$ supply. In power converters that include magnetic isolation or transformers, such as flyback converters, the voltage to the bypass pin/terminal is provided during normal operation after startup through an extra auxiliary winding on the transformer core. Thus, an auxiliary winding is commonly referred to as a supply or bypass winding. The ac induced voltage on the auxiliary winding is typically rectified and filtered by a supply terminal capacitor coupled to the bypass pin/terminal and the auxiliary winding to generate a dc supply voltage on the bypass pin/terminal.

A number of simple DC power supplies regulate the voltage of electronic devices using either series or shunt regulators. Many apply a voltage reference using a shunt regulator such as a Zener diode or an avalanche breakdown diode, or voltage regulator tube. Each of these devices begins conducting at a specified voltage and will conduct as much current as required to hold its terminal voltage to that specified voltage by diverting (i.e., shunting) excess current from a non-ideal power source to ground, often through a relatively low-value resistor to dissipate the excess energy. In a number of applications and integrated circuits (ICs), there is a need to provide a power-efficient auxiliary supply shunt regulator that operates in tandem with a lower output voltage regulator operating from a different input voltage. In such cases, the shunt regulator can take over and limit the output voltage should an auxiliary supply be present in the system.

One of the problems with past designs that operate in this manner is the difficulty of providing a linear shunt regulator that is stable into a large external capacitive load while operating in a lower power mode, just prior to the shunt becoming fully active. Traditionally, there two techniques have been used: (1) a comparator-based "bang-bang" operation that senses if $V_{BP}$ is rising close to the desired shunt regulation voltage so as to turn on the shunt regulation switch; and (2) a linear operation using a standard operational amplifier (op-amp) where the op-amp is used to close the feedback look and regulate stably when required. A drawback of the first approach is increased supply voltage ripple due to inherent oscillation. A drawback of the second approach is that the core op-amp uses significantly more current to remain stable into a large capacitive load, even when the shunt regulator is idle.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
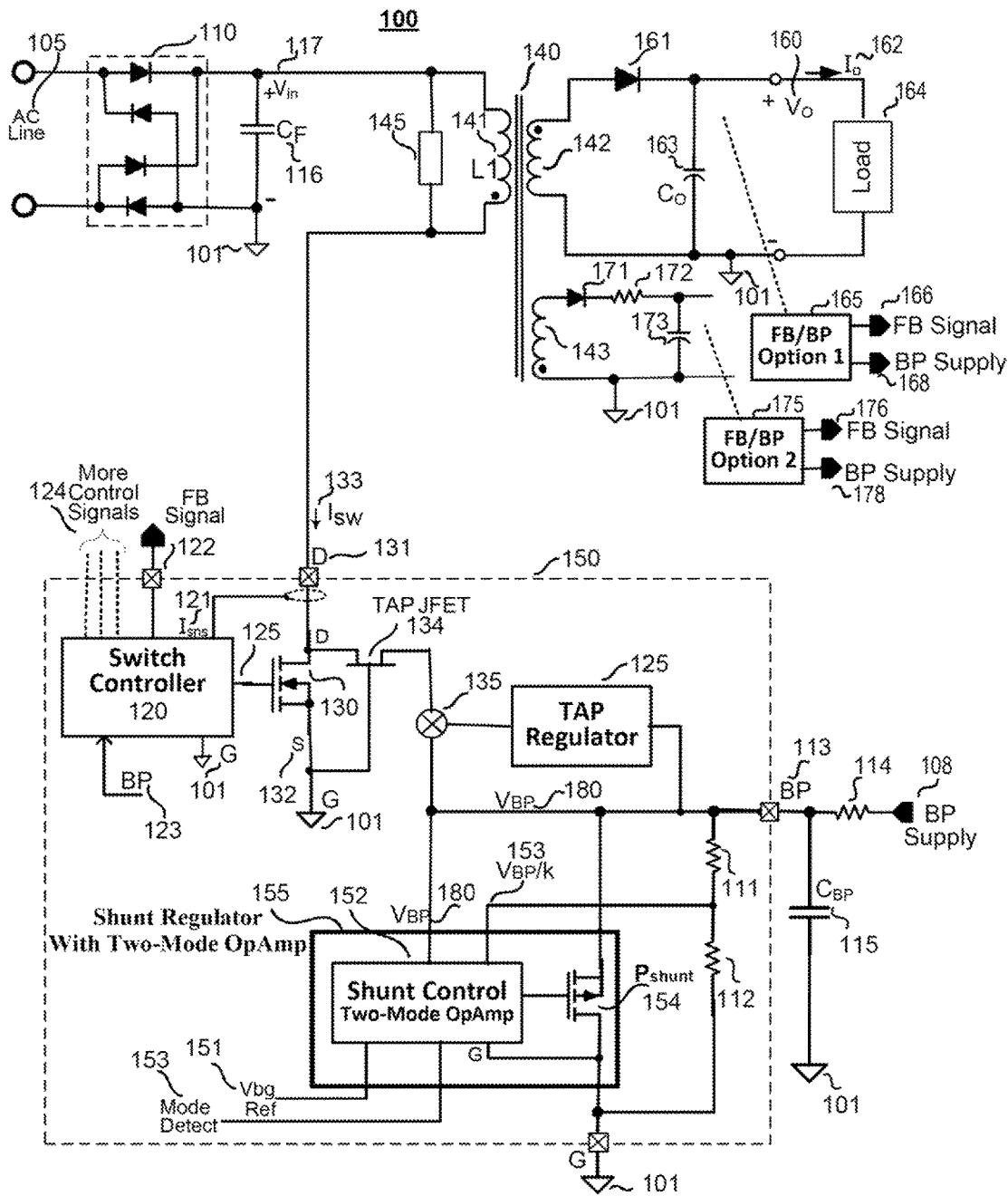
FIG. 1 is a circuit schematic diagram of an example switching power converter which includes a shunt regulator utilizing a two-mode operational amplifier (op-amp).

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description specific details are set forth, such as device types, voltages, component values, configurations, etc., in order to provide a thorough understanding of the embodiments described. However, persons having ordinary skill in the relevant arts will appreciate that these specific details may not be needed to practice the embodiments described. It is further appreciated that well known circuit structures and elements have not been described in detail, or have been shown in block diagram form, in order to avoid obscuring the embodiments described.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

In the context of the present application, when a transistor is in an "off state" or "off" the transistor does not substantially conduct current. Conversely, when a transistor is in an "on state" or "on" the transistor is able to substantially conduct current. By way of example, in one embodiment, a high-voltage transistor comprises an N-channel metal-oxide-semiconductor field-effect transistor (NMOS) with the high-voltage being supported between the first terminal, a drain, and the second terminal, a source. The high voltage MOSFET comprises a power switch that is driven by an integrated controller circuit to regulate energy provided to a load. For purposes of this disclosure, "ground" or "ground potential" refers to a reference voltage or potential against which all other voltages or potentials of an electronic circuit or Integrated circuit (IC) are defined or measured.

A power converter that includes a shunt regulator to provide an efficient supply voltage with low standby loss is described. In one embodiment, the shunt regulator is a linear regulator designed to be stable into an external capacitive load (a bypass capacitor) while operating with very low quiescent current when not needed. Operating in linear mode results in reduced ripple on $V_{BP}$ (bypass pin or terminal). In one embodiment the shunt regulator comprises an op-amp driving a PMOS shunt device with a resistor divider comparing the supply voltage (bypass pin) to a bandgap reference voltage, $V_{bg}$. The op-amp has two operating modes: a low power (comparator-type) slow mode with an intermediate regulation output voltage, and a high power (op-amp linear) fast mode with the normal shunt regulation output voltage. In the low power mode the op-amp has low internal bandwidth and low quiescent operating current. In the high power mode the op-amp has higher internal bandwidth and uses a much higher current (about one order of magnitude larger than in low power mode) so that it is stable into an external capacitive load. In both modes of operation the external capacitor (and load current) forms the dominant pole.

In one embodiment, a current comparator is utilized to determine the shift or transition between low power mode and high power mode. The current comparator senses when a predetermined amount of current (e.g., approximately 75 μA is flowing through the PMOS shunt transistor. At that point, the comparator output flips from a logical low level to a logical high level and the circuit transitions from low power mode to high power mode. In one embodiment, the circuit remains in high power mode until a tap regulator senses a drop in voltage below a certain level (e.g., ~5.1V), which causes the circuit to switch back to low power mode.

In one embodiment, the current comparator drives a latch that is utilized to determine whether the circuit is in the low power or high power mode of operation. In a particular embodiment, the latch is a set-reset (SR) latch. The latch is set by the current comparator, and reset by an output from the tap regulator (e.g., at about 5.1V). During tap regulation the latch may be repeatedly reset. The latch is also reset during power-up.

FIG. 1 shows an example circuit schematic of a power converter 100 that includes a non-isolated flyback power converter with a switching circuit 150 utilizing a shunt regulator 155. Shunt regulator 155 includes a shunt PMOS switch ($P_{shunt}$) 154 and shunt control 152. Shunt control 152 includes a two-mode op-amp based on teaching of the present disclosure. It is appreciated that even though in example of FIG. 1 a non-isolated Flyback power converter is introduced, the shunt regulator with two-mode op-amp could also be used with any other isolated or non-isolated power converter topology. That is, other types of topologies and configurations of switching regulators may be employed in different embodiments. Furthermore, it is noted that although a flyback converter topology is described in the context of an example switching power converter, it is appreciated that the teachings provided herein may also apply to other technologies, e.g., other applications that may involve inductive load switching, and the like.

As shown, power converter 100 includes a rectifier circuit 110 coupled to receive an externally-generated ac input voltage applied across a pair of input terminals 105. In the example shown, rectifier circuit 102 is a full bridge rectifier comprising four diodes that produce a fully wave ac rectified voltage, $V_{IN}$, across input filter capacitor $C_F$ 116 coupled between node 117 and node 101 (i.e., ground potential). In one example, the ac input voltage may be an ordinary ac line voltage (e.g., 85V-265V between 50-60 Hz).

As shown, an energy transfer element 140, which includes a primary winding L1 141 and an output winding 142, is coupled between ac rectified voltage $V_{IN}$ provided at node 117 at an input side of power converter 100 and load 164 at an output side of power converter 100. In one example, energy transfer element 140 is a non-isolated flyback transformer. A clamp circuit 145 is coupled to the primary winding 141 of the energy transfer element 140 to control the maximum voltage on power switch 130. In operation, power switch 130 produces pulsating currents through secondary rectifying diode 161 that is filtered by output capacitor $C_o$ 163 to produce a substantially constant output current $I_o$ 162 at load 164. Output capacitor 163 is coupled between one end of secondary winding 142 of energy transfer element 140 and the cathode of diode 161. The anode of diode 161 is shown coupled to the other end of secondary winding 142. The direction of the secondary rectifying diode 161 is such that when power switch 130 is closed (on-state) no current can pass through secondary winding 142, and when the power switch 130 opens (off-state) current flows from the secondary winding 142 through diode 161 to output capacitor Co 163. Energy is thus transferred to load 164 through output voltage Vo 160 and output current $I_o$ 162.

Circuit block 165 provides a first optional configuration (option 1) in which the bypass BP supply 168 and the feedback FB signal 166 is generated directly from output of power converter 100. Circuit block 175 provides a second optional configuration (option 2) in which bypass BP supply 178 and feedback FB signal 176 are generated indirectly from the output of an auxiliary winding 143 through a rectifier diode 171, filtering capacitor 173 and resistor 172. Persons of skill in the art will understand that in a non-isolated power converter all the signals are referenced to the primary reference ground 101.

Continuing with the circuitry shown in FIG. 1, switching circuit 150 includes power switch 130 which receives a drive signal 125 generated by switch controller 120 in response to feedback FB signal 122, current sense signal $I_{sns}$ 121 (in one example through a sense FET), and one or more control signals 124. Switch controller 120 receives the bypass BP supply 123 and is referenced to the primary ground 101. Power switch 130 may include a tap terminal from drain D 131 of power switch 130. In one example, drain terminal 131 is coupled through a normally ON tap JFET 134, and through a tap regulator 125, to the bypass rail to provide a bypass supply voltage $V_{BP}$ 180 for the internal supply demand. Tap regulator 125 regulates the tap voltage in response to the BP supply voltage 180 across the bypass capacitor $C_{BP}$ 115 at BP supply terminal 113.

In one embodiment, shunt regulator 155 is a linear regulator designed to be stable into an external bypass capacitor $C_{BP}$ 115 while operating with very low quiescent current when not needed. It is appreciated that the lower the value of external bypass capacitor 115 (and/or the lower the value of external shunt resistor 114) the higher the dominant pole, thereby reducing phase margin. In one implementation shunt regulator 155 is designed to be stable into a minimum of 40 nF. In this scenario, the phase margin can drop down to 20 degrees, which is still adequate for stability to avoid entering a comparator high/low switching mode (frequently referred as "bang-bang" mode of operation). The phase margin is much higher into a 1 µF or higher capacitor 115.

In one embodiment, the shift between low power and high power mode is determined by a current comparator that senses when an adequate amount of current (in one example approximately 75 µA) is flowing through shunt transistor 154. Once this comparator flips, the circuit goes into high power mode, and remains there until the tap regulator senses a drop below a bypass voltage threshold (in one example ~5.1V) which pushes the circuit back into the low power mode.

In operation, as external bypass supply voltage $V_{BP}$ 108 (from BP Supply 168 or 178 to 108) ramps up, current flows through external shunt resistor 114 into bypass pin 113, which causes the voltage across bypass capacitor 115 to rise (This voltage is sometimes called $V_{dd}$). A resistive divider formed by resistors 111 and 112 produce a fraction 1/k (e.g., k=4.5) of $V_{BP}$ ($V_{BP}$/k) at node 153 input to shunt control 152. The fractional voltage $V_{BP}$/k is coupled to one input of the two -mode op-amp in shunt control 152. The other input of the op-amp is coupled to receive an internal band-gap $V_{bg}$ (e.g., 1.2V) at node 151. In other words, in one embodiment $V_{dd}$ is divided down by 4.5 and compared to $V_{bg}$ by the two-mode op -amp.

The circuit of FIG. 1 also includes a mode detect signal input to shunt control 152 at node 153. The mode detect signal defines the threshold level between the high power mode and the low power mode to change the operating mode of the shunt regulator two-mode op-amp.

Figure 2:
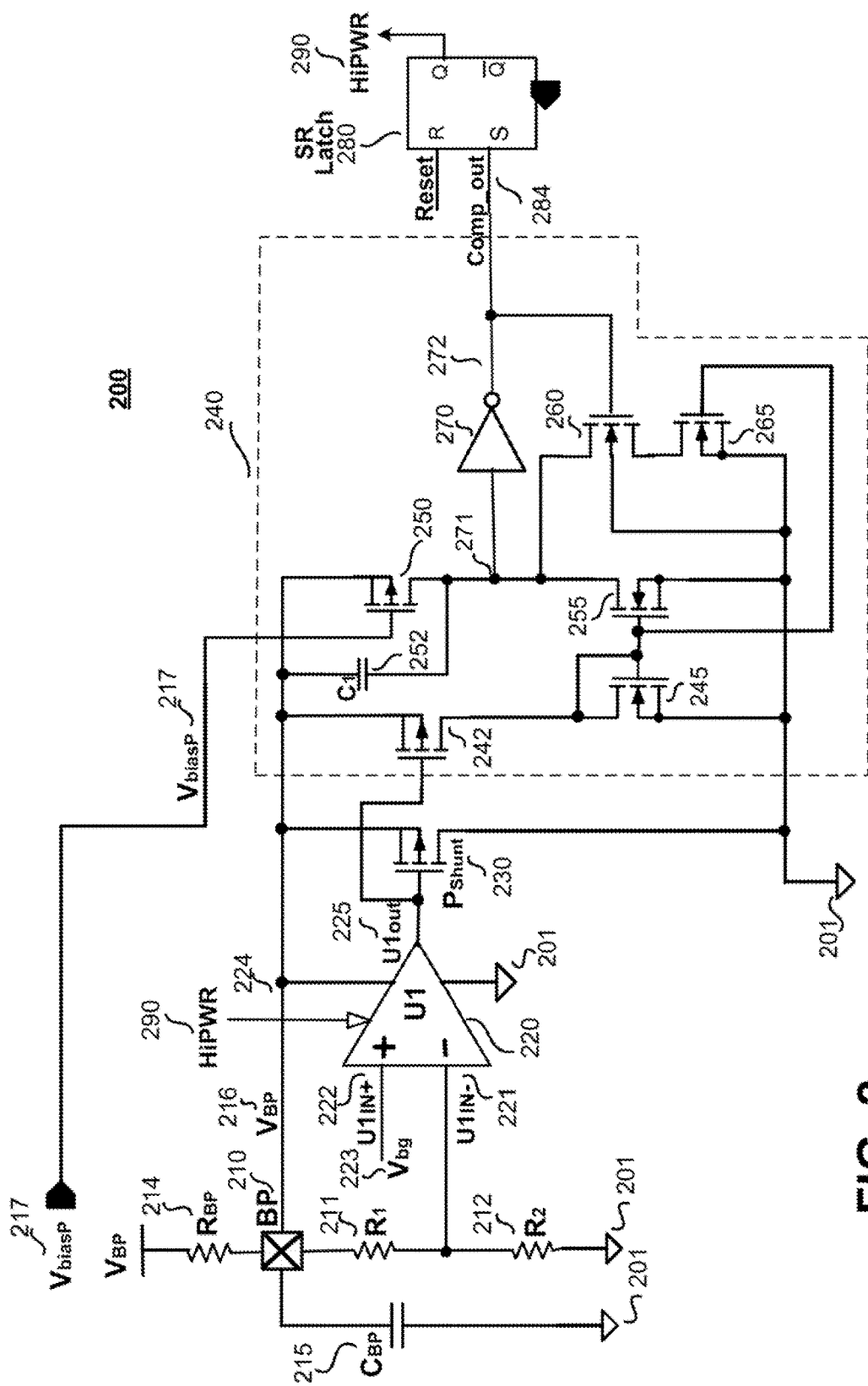
FIG. 2 is a circuit schematic diagram of an example shunt regulator with a two-mode op-amp.

FIG. 2 is a circuit schematic diagram of an example shunt regulator 200 that includes two-mode op-amp (labeled U1) 220 which drives PMOS shunt transistor 230. Bypass terminal BP 210 of the bypass supply rail 216 receives external bypass voltage $V_{BP}$ (i.e., $V_{dd}$) through $R_{BP}$ 214. Bypass terminal BP 210 is shown connected to bypass capacitor $C_{BP}$ 215. The resistive divider formed by resistors R1 211 and R2 212, provides a fraction of the internal bypass voltage $V_{BP}$ to the negative input U1$_{IN}$-221 of two-mode op-amp 220. The bandgap reference voltage $V_{bg}$ 223 is provided to the positive input U1$_{IN}$+ 222 of two-mode op-amp 220. Two-mode op-amp 220 is powered through node 224 from bypass supply rail ($V_{BP}$) 216 to ground 201, Two-mode op-amp 220 is initialized by a signal HiPWR 290 generated from the SR latch 280 (shown in block form), which determines the operating mode of two-mode op-amp 220. Signal HiPWR 290 is a logical signal (stored bit) present at the output marked Q. Practitioners in the art will understand that if S (set) is pulsed high while R (reset) is held low, then the Q output is forced High, and stays high when S returns to low. Similarly, if R is pulsed high while S is held low, then the Q output (HiPWR 290) is forced low, and stays low when R returns to low.

In one embodiment, signal HiPWR 290 is activated by detecting a low power condition to keep two-mode op-amp 220 in low-power mode with a low operating current (e.g., 2 µA) and a systematic offset of $V_{os}$ (e.g., -20 mV). Initially, the loop shown in FIG. 2 regulates to the voltage level defined by the $V_{bg}$ plus an offset $V_{os}$, (k*(Vbg+$V_{os}$), e.g.,= 5.3V); it does so until $V_{BP}$ 216 (Vdd) rises high enough to bring the output signal U1$_{out}$ 225 to a low level, just turning on the PMOS shunt transistor P$_{shunt}$ 230.

The systematic offset can be generated in different ways. In one embodiment, an offset is generated by mismatching the size of transistor devices included in U1 320 of FIG. 3. In another embodiment, the systematic offset is generated by a small fractional change in the resistor divider ratio of R1 211 and R2 212 shown in FIG. 2.

The output signal U1$_{out}$ 225 from two-mode op-amp U1 220 also turns on the PMOS transistor 242 in the current comparator 240. The current through transistor 242 is mirrored through NMOS transistors 245 to the transistor 255 and transistor 265. The high side PMOS transistor 250 is coupled to the bypass rail $V_{BP}$ 216 and carries a current that is controlled by its applied gate voltage $V_{biasP}$ 217. The voltage signal $V_{biasP}$ 217 may be generated by an on-chip bias circuit that provides a DC voltage that is approximately a gate-source voltage $V_{gs}$ below the voltage level $V_{BP}/V_{dds}$. Application of voltage $V_{biasP}$ 217 to PMOS transistor 250 causes it to operate in saturation and act as a fixed current source, with a current magnitude that is determined by the transistor size and the value of $V_{biasP}$ 217.

At node 271 the logic low or logic high is defined based on a comparison of currents flowing in the upper-side PMOS transistor 250 and the lower -side NMOS transistor 255. In other words the logic low or logic high at node 271 responds to the balance between the bypass voltage $V_{BP}$ 216 and the shunt current sinking through the shunt transistor P$_{shunt}$ 230. The logic low or logic high signal at node 271 is input into inverter 270, which generates the logic output signal Comp2 284 of current comparator 240. Signal Comp2 284 is coupled to the set-terminal S of SR latch 280; wherein the Reset terminal R 282 is coupled to an output from a tap comparator (not shown) inside the tap regulator that resets latch 280 at a low threshold level of bypass voltage (e.g., ~5.1V). During tap regulation latch 280 is repeatedly reset. Latch 280 is also reset during power-up.

The output of latch 280 generates the HiPWR signal 290 to determine the high power and low power modes of operation of the two-mode op-amp U1 220. It is appreciated that the transistor 265 which receives the mirrored current of transistor 245 is in series with transistor 260, the latter of which is activated by output signal Comp2 284 of current comparator 240. Transistors 260 and 265 provide a hysteresis for stable operation of current comparator 240.

In operation, when current comparator 240 senses a high power threshold current (e.g., 75 µA) in shunt transistor P$_{shunt}$ 230, signal Comp2 284 transitions to a logic high level, which sets HiPWR signal 290 high. A logical high HiPWR signal 290 causes op-amp U1 220 to change to a high-power mode of operation. This removes the systematic offset voltage of $V_{os}$ (e.g., -20 mV) and increases the operating current (and bandwidth) of op-amp U1 220 (e.g., in one embodiment, by a factor of 16). In the high-power mode, the closed loop shown in the example of FIG. 2 regulates at a slightly higher level of k*($V_{bg}$-0) (e.g., 4.5×(1.2 -0)~5.4 V). Thus the regulator ramps up in a step response, e.g., stepping up from about 5.3 V to ~5.4 V.

Practitioners in the art will appreciate that a main advantage of utilizing two-mode op-amp U1 220, as described above, is that the shunt regulator operates at a low quiescent current (e.g., ~2 µA) during power-up or conditions where HiPWR signal 290 is reset, and at a substantially higher current (e.g., ~40 µA) when the shunt regulator is fully active. It is further appreciated that oscillation at transition between low power and high power modes is prevented by the use of SR latch 280. SR latch 280 is set by current comparator 240, and reset at a low bypass voltage threshold level, e.g., ~5.1 V (via an output from the tap comparator that resets SR latch 280). SR latch 280 is also reset during power-up.

Figure 3:
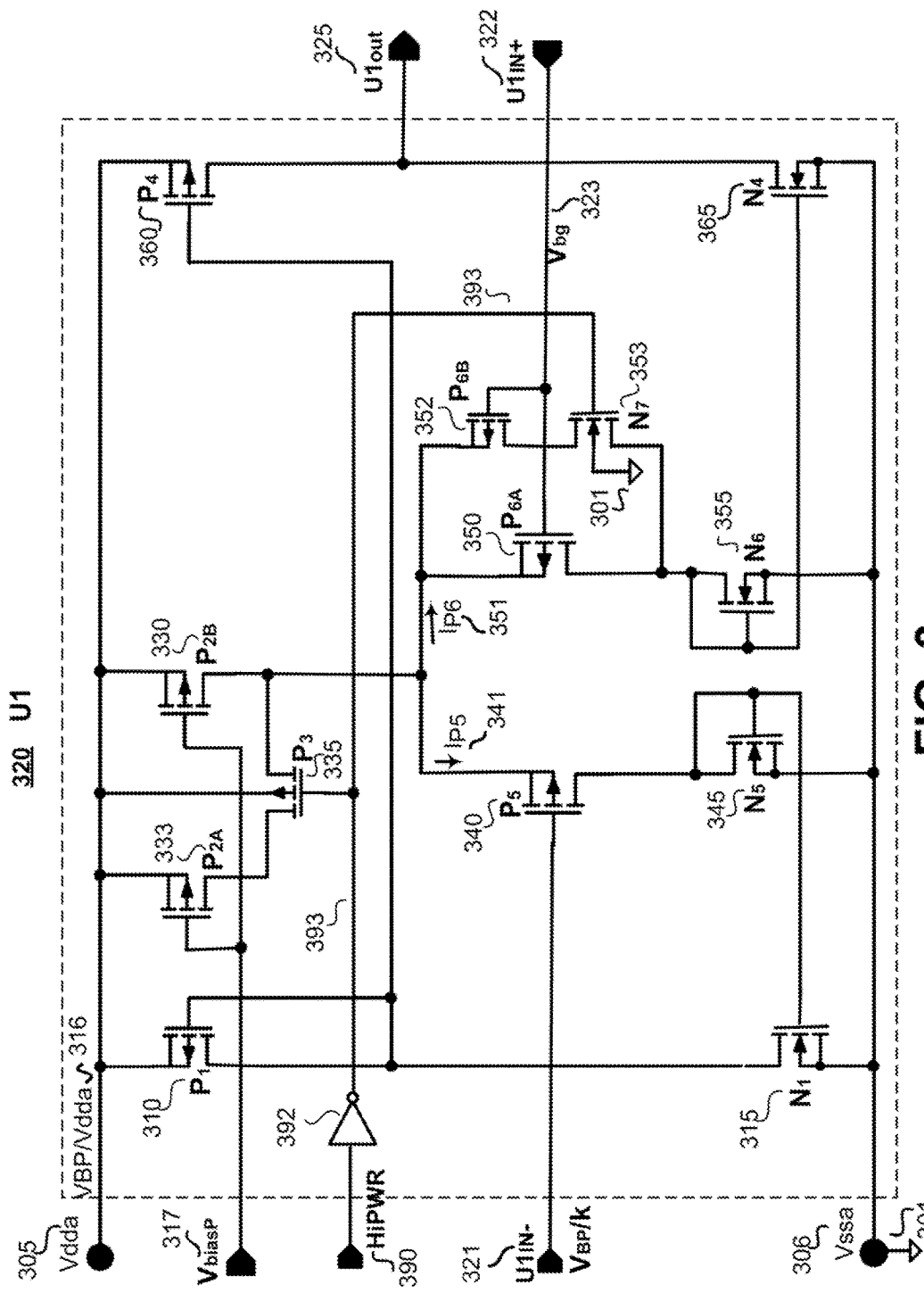
FIG. 3 is a detailed circuit schematic diagram of an example two-mode op-amp.

FIG. 3 is a detailed circuit schematic diagram of an example two-mode op-amp 320. Two-mode op-amp 320 is shown as a current mirror transconductance amplifier with PMOS input transistors in a differential arrangement. In one example, in either the low-power or high-power modes of operation the DC gain remains the same (typically ~55 dB). However, a systematic offset may be generated in low power mode by mismatching the relative sizes of input devices P5 340, coupled to the negative input $U1_{IN}$–321, and $P_{6A}$ 350, coupled to the positive input $U1_{IN}$+322. Two relatively small-sized transistors $P_{6B}$ 352 and $N_7$ 353 are shown coupled across $P_{6A}$ 350. The lower NMOS transistor $N_7$ 353 is controlled by the HiPWR signal 390 (through inverter 392) that generates control signal 393 for both transistors $P_3$ 335 and transistor $N_7$ 353.

In high power mode the control signal to transistor $N_7$ 353 is low keeping it in the OFF state, and decoupling transistor $P_{6B}$ 352 from the main input transistor $P_{6A}$ 350, such that both input transistors introduce matched/balanced input impedances with zero offset. In low power mode the control signal 393 to transistor $N_7$ 353 transitions high, turning it to the ON state, thereby coupling transistor $P_{6B}$ 352 in parallel with the main input transistor $P_{6A}$ 350. In one embodiment, the size of transistor $P_{6B}$ 352 is much smaller than transistor $P_{6A}$ 350 resulting in a small fraction of change in the total size of transistors at positive input $U1_{IN}$+322 in comparison to transistor $P_5$ 340 at negative input $U1_{IN}$–321. Currents $I_{P5}$ 341 and $I_{P6}$ 351A consequently show a small mismatch that results in an intentionally introduced systematic offset voltage.

Persons of skill in the art will appreciate that generating the systematic offset voltage may also be achieved in low power mode by paralleling a much bigger resistor with the low side resistor R2 212 through a controlled switch that receives its control signal from NiPWR bus 290. The divider ratios K1 in low-power mode and K2 in high power mode that differ slightly from each other would result in the two regulation set points of K1 * $V_{bg}$ and K2 * $V_{bg}$. Note that the systematic offset generation scheme discussed previously creates two regulation set points with a fixed divider ratios K, as of K * ($V_{bg}$+$V_{os}$) and K * $V_{bg}$, wherein offset voltage $V_{os}$ is generated by mismatching size of input devices. In either scheme, a first temporary regulation point, or trip point, is created that is slightly lower than the shunt voltage final regulation point.

As discussed above, the systematic offset is different in low-power and high-power modes of operation (e.g, 0 mV in high power mode and –20 mV in low power mode).

As shown, two-mode op-amp 320 includes a PMOS P1 310 and a NMOS N1 315 coupled in series between voltage supply rails 305 ($V_{dda}$) & 306 ($V_{ssa}$). PMOS P1 310 is diode connected and mirrors the current flowing through the NMOS N1 315 to the output PMOS P4 360. Also shown are a PMOS P2A 333 and a PMOS P2B 330 that are coupled in parallel through a PMOS switch P3 335. The control signal applied to the gates of P2A 333 and PMOS P2B 330 is provided by $V_{biasP}$ 317, which is a voltage signal generated by an on-chip bias circuit. The voltage signal $V_{biasP}$ 317 is a DC voltage that is approximately a gate-source voltage $V_{gs}$ drop below the voltage level $V_{BP}/V_{dda}$. Application of voltage $V_{biasP}$ 317 to PMOS transistors 330 & 333 causes them to operate in saturation and act as a fixed current sources, with a current magnitude that is determined by the transistor size and the value of $V_{biasP}$ 317.

Continuing with the example two-mode op-am 321 shown in FIG. 3, PMOS switch P3 335 is controlled by HiPWR signal 390 through inverter 323. As configured, PMOS switch P3 335 is turned on (conducting) when HiPWR signal 390 is high, indicating high power mode. When PMOS switch P3 335 is turned on, PMOS P2A 333 is connected in parallel with PMOS P2B 330, which results in increased current provided to the differentially configured input PMOS transistors 340 & 350. In one example embodiment, the conduction changes by a factor of M (conduction changing from 0.5 µA to 8 µA, i.e., M=16).

The negative input $U1_{IN}$– to two-mode op-amp 320 is provided to the gate of PMOS P5 340. The positive input $U1_{IN}$+ to two-mode op-amp 320 is provided to the gate of PMOS P6 350. The diode connected NMOS N5 345 mirrors the current in PMOS P5 340 to NMOS N1 315. Similarly, the diode connected NMOS N6 355 mirrors the current in PMOS P6 350 to NMOS N4 365. The positive input $U1_{IN}$+ to two-mode op-amp 320 is band-gap voltage $V_{bg}$, which is utilized as a threshold reference to regulate bypass voltage $V_{BP}$.

In operation, when high power mode operation is detected, signal HiPWR 390 is logically high, and PMOS switch P3 335 is turned on (via inverter 392), thereby increasing the conduction in the paralleled paths provided by PMOS P2A 333 & PMOS P2B 330 by a factor of M (e.g., M=16). The total current flowing through PMOS P2A 333 & PMOS P2B 330 flows through PMOS transistors P5 340 and/or PMOS P6 350, depending on the inputs $U1_{IN}$+322 and $U1_{IN}$–321. Current $I_{P5}$ 341 through transistor PMOS P5 340 is in response to the bypass voltage (in linear mode, $V_{BP}/k$ applied to its gate), whereas current through transistor PMOS P6 350 is in response to the band-gap voltage (in linear mode, its gate voltage is $V_{bg}$ 323). Stated differently, the current flowing though PMOS P5 340 is proportional to the bypass voltage $V_{BP}/k$ provided at negative input $U1_{IN}$– 321, whereas the current flowing though PMOS P6 350 is proportional to the band-gap voltage $V_{bg}$ 323 provided at positive input $U1_{IN}$+322.

The above description of illustrated example embodiments, including what is described in the Abstract, are not intended to be exhaustive or to be limitation to the precise forms or structures disclosed. While specific embodiments and examples of the subject matter described herein are for illustrative purposes, various equivalent modifications are possible without departing from the broader spirit and scope of the present invention. Indeed, it is appreciated that the specific example currents, voltages, resistances, capacitances, etc., are provided for explanation purposes and that other values may also be employed in other embodiments and examples in accordance with the teachings of the present invention.

I claim:

1. A shunt regulator for use in a power converter having an energy transfer element with an input side that receives an ac line, and an output side that delivers an output signal to a load, a power switch being coupled to a primary winding of the energy transfer element for regulating a transfer energy of the output signal delivered to the load, an auxiliary winding of the energy transfer element being utilized to produce an internal bypass voltage, $V_{BP}$, at a bypass pin coupled to an external capacitive load, the shunt regulator comprising:

a shunt switch coupled between the bypass pin and a ground potential;

an operational amplifier (op-amp) that produces an output signal that controls a shunt current through the shunt switch, the op-amp including:

a first input coupled to receive a reference voltage;

a second input coupled to a divider circuit that provides a fractional voltage of the internal bypass voltage at the second input;

a third input coupled to receive a logical signal, when the logical signal is in a first logical state the op-amp operates in a closed-loop, low-power mode that regulates the internal bypass voltage to a first voltage level, and when the logical signal is in a second logical state the op-amp operates in a closed-loop, high-power mode that regulates the internal bypass voltage to a second voltage level that is higher than the first voltage level;

a latch that outputs the logical signal; and current comparator circuitry that drives the latch, the current comparator circuitry being coupled to sense the shunt current, when the shunt current exceeds a predetermined level the current comparator circuitry causing the logical signal output by the latch to transition from the first logical state to the second logical state, thereby switching the op-amp from the low-power mode to the high-power mode of operation.

2. The shunt regulator of claim 1 wherein the reference voltage is an internal band gap voltage, $V_{bg}$.

3. The shunt regulator of claim 1 wherein divider circuit is a resistive divider circuit.

4. The shunt regulator of claim 2 wherein the fractional voltage is a fraction 1/k of the internal bypass voltage, $V_{BP}$.

5. The shunt regulator of claim 1 wherein the shunt regulator is a linear regulator.

6. The shunt regulator of claim 4 wherein at power-up the op-amp is initially in the low-power mode of operation, and the first voltage level is defined as $(k*(V_{bg}+V_{os})$, where $V_{os}$ is an offset voltage.

7. The shunt regulator of claim 1 wherein the power converter further includes a tap regulator coupled between the power switch and the bypass pin, the tap regulator producing an output coupled to reset the latch in response to the internal bypass voltage dropping below a threshold, the output of the tap regulator causing the logical signal to transition from the second logical state to the first logical state.

8. The shunt regulator of claim 1 wherein the threshold is approximately 5.1 volts.

9. The shunt regulator of claim 1 wherein the first logical state is a logical low level and the second logical state is a logical high level.

10. The shunt regulator of claim 1 wherein k is approximately equal to 4.5.

11. The shunt regulator of claim 6 wherein the op-amp comprises first and second MOSFET devices configured as a differential pair, the first MOSFET device being coupled to receive the first input and the second MOSFET device being coupled to receive the second input, the offset voltage being generated by size mismatch as between the first and second MOSFET devices.

12. The shunt regulator of claim 11 wherein the size mismatch comprises a pair of series connected fractional MOSFETS coupled in parallel with the first MOSFET device, each of the fractional MOSFETS having a relatively small size as compared with the first input MOSFET, current flow through the second fractional MOSFET being controlled by the logical signal.

13. The shunt regulator of claim 6 wherein the divider circuit comprises a resistor divider circuit having first and second resistors, the first resistor being coupled between the bypass pin and the second input of the op-amp, the second resistor being coupled in series between the second input and the ground potential.

14. The shunt regulator of claim 13 further comprising a third resistor coupled through a switch controlled by the logical signal, the third resistor being coupled between the second input of the op-amp and the ground potential when the logical signal is in a first logical state, thereby generating the offset voltage.

* * * * *